United States Patent
Vaccari et al.

(10) Patent No.: US 10,780,306 B2
(45) Date of Patent: *Sep. 22, 2020

(54) PROCESS FOR THE DESTRUCTION OF MATRIX MATERIAL BY CAVITATION AND ACID-BASED CHEMICAL REACTION

(71) Applicants: Bruno Vaccari, Foligno (IT); Tullia Zucca, Comazzo (IT)

(72) Inventors: Bruno Vaccari, Foligno (IT); Tullia Zucca, Comazzo (IT)

(*) Notice: Subject to any disclaimer, the term of this patent is extended or adjusted under 35 U.S.C. 154(b) by 0 days.

This patent is subject to a terminal disclaimer.

(21) Appl. No.: 16/142,723

(22) Filed: Sep. 26, 2018

(65) Prior Publication Data

US 2019/0022446 A1    Jan. 24, 2019

Related U.S. Application Data

(63) Continuation-in-part of application No. 15/721,683, filed on Sep. 29, 2017, now Pat. No. 10,384,089, which is a continuation-in-part of application No. 15/299,398, filed on Oct. 20, 2016, now abandoned.

(60) Provisional application No. 62/320,934, filed on Apr. 11, 2016.

(51) Int. Cl.
| | | |
|---|---|---|
| A62D 3/30 | (2007.01) | |
| A62D 3/36 | (2007.01) | |
| A62D 3/02 | (2007.01) | |
| A62D 3/20 | (2007.01) | |
| B09B 3/00 | (2006.01) | |
| A62D 3/19 | (2007.01) | |
| A62D 101/41 | (2007.01) | |

(52) U.S. Cl.
CPC ............ *A62D 3/36* (2013.01); *A62D 3/02* (2013.01); *A62D 3/19* (2013.01); *A62D 3/20* (2013.01); *B09B 3/00* (2013.01); *B09B 3/0066* (2013.01); *A62D 2101/41* (2013.01); *A62D 2203/02* (2013.01)

(58) Field of Classification Search
CPC .............................. A62D 3/30; B65D 81/3266
USPC .......................................................... 588/313
See application file for complete search history.

(56) References Cited

U.S. PATENT DOCUMENTS 10,384,089 B2 *   8/2019   Vaccari .................... A62D 3/36

* cited by examiner

*Primary Examiner* — Edward M Johnson
(74) *Attorney, Agent, or Firm* — John Rizvi; John Rizvi, P.A.—The Patent Professor

(57) ABSTRACT

An accelerated process for the complete destruction of a matrix material, such as a matrix material including cement and/or asbestos-containing materials (ACMs), is disclosed. The process comprises forming a slurry or suspension by combining the matrix material with an acid solution (including, for instance, acid waste, which can also be neutralized by the process), causing acid-based chemical reactions in the slurry that cause the destruction of the matrix material. Simultaneously to the chemical reactions, the slurry or suspension is subjected to cavitation, which synergistically cooperates with the chemical reactions to accelerate matrix material destruction. The matrix material can be ground and polarized prior to being submerged in the acid solution to form the slurry. The slurry can be subjected to hydrothermal treatment. Inert secondary raw materials (SRMs) that are non-hazardous to the environment and human health can be obtained from the process.

23 Claims, 3 Drawing Sheets

PROCESS FOR THE DESTRUCTION OF MATRIX MATERIAL BY CAVITATION AND ACID-BASED CHEMICAL REACTION

CROSS-REFERENCE TO RELATED APPLICATIONS

This application is a Continuation-In-Part of U.S. Utility patent application Ser. No. 15/721,683, filed on Sep. 29, 2017, which in turn is a Continuation-In-Part of U.S. Utility patent application Ser. No. 15/299,398, filed on Oct. 20, 2016, which claims the benefit of U.S. Provisional Patent Application Ser. No. 62/320,934, filed on Apr. 11, 2016, which are incorporated by reference herein in their entirety.

FIELD OF THE INVENTION

The present invention generally relates to processes for destruction of matrix materials such as cement, concrete, and asbestos-containing materials, and more particularly, to a continuous, accelerated and complete process for the destruction of a matrix material by simultaneously- and synergistically-subjecting the matrix material to chemical reactions with an acid in an acid solution and causing a cavitation within the slurry formed by the matrix material and the acid solution.

BACKGROUND OF THE INVENTION

Concrete is a mixture of paste and aggregates (e.g., rocks, stones, sand). The paste, composed of cement and water, coats the surface of the fine (small) and coarse (larger) aggregates. Through a chemical reaction called hydration, the paste hardens and gains strength to form a rock-like mass known as concrete. Within this process lies the key to a remarkable trait of concrete: it is plastic and malleable when newly mixed, yet strong and durable when hardened. These qualities explain why concrete can be successfully used to build a myriad of structures including skyscrapers, bridges, sidewalks, superhighways, dams and houses.

Cement's chemistry comes to life in the presence of water. Cement and water form a paste that coats each particle or piece of the aggregates. Through a chemical reaction called hydration, the cement paste hardens and gains strength. The quality of the paste determines the character of the concrete. The strength of the paste, in turn, depends on the ratio of water to cement. The water-cement ratio is the weight of the mixing water divided by the weight of the cement. High-quality concrete is produced by lowering the water-cement ratio as much as possible without sacrificing the workability of fresh concrete, allowing it to be properly placed, consolidated, and cured. A properly designed concrete mix possesses the desired workability for the fresh concrete and the required durability and strength for the hardened concrete. Typically, a concrete mix is about 10 to 15 percent cement, 60 to 75 percent aggregate and 15 to 20 percent water. Entrained air in many concrete mixes may also take up another 5 to 8 percent.

Curing begins after the exposed surfaces of the concrete have hardened sufficiently to resist marring. Curing ensures the continued hydration of the cement so that the concrete continues to gain strength. Concrete surfaces are cured by sprinkling with water fog, or by using moisture-retaining fabrics such as burlap or cotton mats. Other curing methods prevent evaporation of the water by sealing the surface with plastic or special sprays called curing compounds. Special techniques are used for curing concrete during extremely cold or hot weather to protect the concrete. The longer the concrete is kept moist, the stronger and more durable it will become. The rate of hardening depends upon the composition and fineness of the cement, the mix proportions, and the moisture and temperature conditions. Concrete also continues to get stronger as it gets older. Most of the hydration and strength gain take place within the first month of concrete's life cycle, but hydration continues at a slower rate for many years.

Hydration involves many different reactions, often occurring at the same time. As the reactions proceed, the products of the cement hydration process gradually bond together the individual aggregate (e.g., sand and gravel) particles and other components of the concrete to form a solid mass. The empirical formula of concrete can be written as:

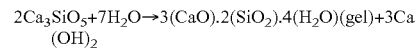

$$2Ca_3SiO_5 + 7H_2O \rightarrow 3(CaO).2(SiO_2).4(H_2O)(gel) + 3Ca(OH)_2$$

where the exact ratios of the CaO, $SiO_2$ and $H_2O$ in C—S—H can vary.

Many types of concrete are available, distinguished by the proportions of the main ingredients used. In this way, or by substitution for the cementitious and aggregate phases, the finished product can be tailored to its application. Strength and density, as well as chemical and thermal resistance, are variables. Concrete production is the process of mixing together the various ingredients—water, aggregate(s), cement, and any additives—to produce concrete. Concrete production is time-sensitive. Once the ingredients are mixed, workers must put the concrete in place before it hardens.

Different mixes of concrete ingredients produce different strengths. In general, concrete has a relatively high compressive strength and a lower tensile strength. To void this weakness, it is usually reinforced with materials that are strong in tension. The elasticity of concrete is relatively constant at low stress levels but starts decreasing at higher stress levels as matrix cracking develops. Concrete has a very low coefficient of thermal expansion and shrinks as it matures. All concrete structures crack to some extent, due to shrinkage and tension. Concrete that is subjected to long-duration forces is prone to creep. Concrete can be damaged by many processes, such as the expansion of corrosion products of steel reinforcement bars embedded in the concrete, freezing of trapped water, fire or radiant heat, aggregate expansion, sea water effects, bacterial corrosion, leaching, erosion by fast-flowing water, physical damage and chemical damage (from carbonatation, chlorides, sulfates and distillate water).

Concrete recycling is an increasingly common method for disposing of concrete structures. Concrete debris was once routinely shipped to landfills for disposal, but recycling is increasing due to improved environmental awareness, governmental laws and economic benefits. Concrete, which must be free of trash, wood, paper and other such materials, is usually collected from demolition sites and put through a crushing machine, often along with bricks and rocks. Reinforced concrete contains rebar and other metallic reinforcements, which are removed with magnets and recycled elsewhere. Crushed recycled concrete can sometimes be used as the dry aggregate for brand new concrete if it is free of contaminants, though the use of recycled concrete limits strength and is not allowed in many jurisdictions. On Mar. 3, 1983, a U.S. government-funded research team estimated that almost 17% of worldwide landfill was by-products of concrete based waste.

Acids are also known and used in chemistry and other technical fields. In 1923, Bronsted and Lewis, separately, introduced the modern acid nomenclature. They first saw acids as molecules capable of delivering a Hydrogen ion to other molecules that could accept it, and drew attention to the fact that the dimensionally tiny hydrogen ion could create a giant electric field in proportion, hence a very high polarization of the space around it. Lewis revolutionized the concept of acid by dislodging the concept from hydrogen ion and, indeed, from hydrogen itself. Thanks to this scientist, compounds that do not even contain hydrogen ions (e.g., BF3, Boro Trifluoride) are also referred to as acids; this also disputes the common acid concept of a liquid in an aqueous solution, being gaseous at a temperature above 12° C. at atmospheric pressure. Such molecule categories are called Lewis Acids and have the feature of having an electronic duplex, in an outer orbital of the atom, not engaged in a chemical bond and behave in a particular way to the point that it is referred to as "Lone Pair". Lewis classified protonic acids as secondary acids by reserving the title of primary acids to those who are able to accept the pair of Lone Pairs electrons. Therefore, based on the Lewis classification, hydrochloric acid (HCl), sulfuric acid ($H_2SO_4$), etc., are not primary acids, as they are complex molecules of electrons and therefore cannot accept Lone Pairs.

Therefore, an acid is a chemical molecule that if isolated, homogeneous and marketable, is not a waste but a value, normally finding a viable location and virtually immediate saleability on the market. If, however, the acid is mixed with other substances, it is hardly recoverable with an economically viable process. At these conditions, it becomes a waste and therefore its disposal has a high cost, because the acid must be treated to render it harmless. The optimal disposal process for acid waste is one that not only destroys the molecule, but also allows the molecule to react obtaining other products that are still valid on the market or even more valid and beneficial for human health and/or the environment than the initial acid.

In summary, an acid is a molecule or ion capable of donating a hydron (proton or hydrogen ion H+), or, alternatively, capable of forming a covalent bond with an electron pair (a Lewis acid). Acidity (or the amount of acid in a given substance) is measured with a number called pH, and acids have a pH less than 7. Chemically, acids are chemicals that contain positive hydrogen ions. The strength of an acid refers to its ability or tendency to lose a proton. A strong acid is one that completely dissociates in water; in other words, one mole of a strong acid HA dissolves in water yielding one mole of H+ and one mole of the conjugate base, A−, and none of the protonated acid HA. In contrast, a weak acid only partially dissociates and at equilibrium both the acid and the conjugate base are in solution. There are numerous uses for acids. In the chemical industry, acids react in neutralization reactions to produce salts. Acids are also used as catalysts in industrial and organic chemistry.

As mentioned heretofore, acids must often be disposed of. Acid solution treatment/neutralization is exothermic and may be potentially hazardous. It is particularly important to dispose of acids with very low pH (<2) safely. If a low-pH acid doesn't have heavy metals or other toxic substances dissolved in it, neutralizing the pH to a less acidic level (pH 6.6-7.4) allows to dispose of the substance in the standard sewer system. If heavy metals are present, the solution must be treated as hazardous waste and disposed of through the proper channels. In the past, some hazardous wastes have been disposed of in regular landfills. This has resulted in unfavorable amounts of hazardous materials seeping into the ground. These chemicals eventually have entered into natural hydrologic systems. In consequence, many landfills have required or still require countermeasures against groundwater contamination.

Asbestos is another material commonly used in industry, and consists in a fibrous material which includes mineral silicates having a markedly fibrous asbestiform mineral growth habit and belonging to the amphibole or serpentine families. The mineral silicates are made up of incombustible, chemically-resistant, inert, phono-absorbing, flexible and tensile fibers. Asbestos mineral deposits can be found throughout the world and are still mined in Australia, Canada, South Africa and the former Soviet Union.

The chemical and physical properties of asbestos, namely its heat resistance, tensile strength and insulating properties, have rendered it one of the most important inorganic materials for industrial uses and technological applications. Asbestos minerals have been used in the construction of building materials such as cement products, acoustic and thermal sprays, pipe and boiler wraps, flooring and roofing materials, plasters, paints and many others.

Asbestos is characterized by a crystal formation of long, thin fibers, which makes asbestos quite different from other materials. Based upon its crystalline structure, asbestos may be classified as either serpentine or amphibole.

Serpentine asbestos has a sheet or layered structure. Serpentine minerals are usually associated with ultramafic Mg-rich rocks such as altered basalt which have been changed at different temperatures and in the presence of water in an alteration process known as serpentinization. The only member of the serpentine group, chrysotile, also known as "white asbestos", is the most common type of asbestos found in buildings and is the predominant fibrous form of serpentine. Chrysotile is a fibrous mineral which does not burn or rot, is resistant to most chemicals, is flexible and possesses high tensile strength. This unique combination of properties makes chrysotile ideal as a major component of lightweight reinforced cement products, friction materials, high temperature seals, gaskets and a host of other materials. Chrysotile has been known for over 2000 years, being used initially for cremation cloths, oil lamp wicks and other textiles. In the 19th Century, chrysotile was first mined commercially in the Urals (Russia), Italy and Canada. Although it is the least abundant of the three traditional serpentine minerals, chrysotile accounts for some 95% of world asbestos production, and hence, is of key importance when the health effects of serpentine dust are considered. Chrysotile makes up approximately 90 to 95% of all asbestos used in buildings in the United States.

Amphibole asbestos, in turn, has a chain-like structure. There are five types of asbestos in the amphibole group: (1) amosite, which is the second most prevalent type of asbestos found in building materials and is also known as "brown asbestos"; (2) crocidolite, or "blue asbestos," which is used in specialized high-temperature applications; (3) anthophyllite; (4) tremolite; and (5) actinolite. Anthophyllite, tremolite and actinolite are rare and are mainly present as contaminants in other minerals.

The amphibole group of minerals that include crystalline asbestos is based on the double-chain silicate tetrahedral structure which is cross-linked with bridging cations including magnesium, iron, calcium and sodium. The basic structural unit of amphiboles is (Si4O11)-6. The empirical formula of amphiboles can be written as:

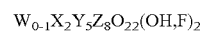

where W=$Na^{+1}$ or $K^{+1}$ in the A site with 10 to 12 fold coordination; X=$Ca^{+2}$, $Na^{+1}$, $Mn^{+2}$, $Fe^{+2}$, $Mg^{+2}$, $Fe^{+3}$, in an M4 site with 6 to 8 fold coordination; Y=$Mn^{+2}$, $Fe^{+2}$, $Mg^{+2}$, $Fe^{+3}$, $Al^{+3}$ or $Ti^{+4}$ in an M1 octahedral coordination site; and Z=$Si^{+4}$ and $Al^{+3}$ in the tetrahedral site.

The empirical formula of crocidolite (riebeckite asbestos) can be written as $Na_2(Fe^{2+},Mg)_3Fe^{3+}{}_2Si_8O_{22}(OH)_2$. Iron can be partially substituted with $Mg^{2+}$ within the crocidolite structure. Crocidolite fiber bundles typically easily disperse into fibers that are shorter and thinner than other amphibole asbestos fibers which are similarly dispersed. However, crocidolite fibrils are generally not as small in diameter as chrysotile fibrils. In comparison with other amphiboles or chrysotile, crocidolite has a relatively poor resistance to heat. Its fibers, instead, are used extensively in applications requiring good resistance to acids. Crocidolite fibers have fair to good flexibility, fair spinnability, and a texture ranging from soft to harsh.

In amosite (grunerite asbestos), the $Fe^{2+}$ to $Mg^{2+}$ ratio varies, but is usually about 5.5:1.5. Amosite fibrils are generally larger than crocidolite fibrils, but are smaller than particles of anthophyllite asbestos similarly comminuted. Amosite fibrils typically have straight edges and characteristic right-angle fiber axis terminations.

Anthophyllite asbestos is a relatively rare, fibrous, orthorhombic, magnesium-iron amphibole, which occasionally occurs as a contaminant in talc deposits. Anthophyllite fibrils are typically more massive than those of other common forms of asbestos.

Finally, tremolite asbestos (a monoclinic calcium-magnesium amphibole) and actinolite asbestos (an iron-substituted derivative of tremolite asbestos) rarely occur in the asbestos habit and yet are common as contaminants of other asbestos deposits. Actinolite asbestos occurs as a contaminant fiber in amosite deposits, whereas tremolite asbestos occurs as a contaminant of both chrysotile and talc deposits. Tremolite asbestos fibrils range in size but may approach the dimensions of crocidolite and amosite fibrils.

The mechanisms of amphibole breakage are important biologically with regard to resultant particle number, surface area and general respirability (all of which control penetration to target cells and delivered dose), and also with regard to expressed chemical information contained on the fiber surface.

In nature, asbestos samples usually contain different cations from those used to describe the double-layer structure. Al+3 and Fe+3 may substitute for Si+4, and Fe+2, Fe+3, Mn+2 and Ni+2 can all substitute for Mg+2 to a greater or lesser degree. These substitutions may be summarized in a chemical formula written as:

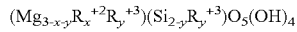

where $R^{+2}=Mn^{+2}$ or $Ni^{+2}$ and $R^{+3}=Al^{+3}$ or $Fe^{+3}$.

Because it has been unquestionably linked to lung cancer, asbestosis and pleural mesothelioma, asbestos is now considered to be a human health hazard. Furthermore, the use of asbestos is currently forbidden in several technologically-advanced countries. However, normally, asbestos-containing materials (ACMs) in buildings do not pose a hazard to occupants and workers in those buildings except when asbestos fibers become airborne and are inhaled. In other words, intact, undisturbed asbestos-containing materials generally do not pose a health risk. It is when the asbestos-containing materials are damaged, disturbed or deteriorated over time that the asbestos-containing materials release asbestos fibers into the air inside the buildings and may become hazardous and pose an increased risk. As a toxic substance and known carcinogen, asbestos can cause several serious diseases in humans. Symptoms of these diseases typically develop over a period of years following asbestos exposure.

Each country may set its own standards as to the definition of a hazardous or dangerous asbestos-containing material. For instance, the Environmental Protection Agency (EPA) in the U.S. classifies any material containing more than 1 wt % asbestos as an asbestos-containing material (ACM); a similar classification is defined in Italy by D.L. 277, 15 Aug. 1991.

Asbestos-containing materials can be basically divided into friable and compact asbestos materials. Friable asbestos designates any asbestos-containing material that can be easily crumbled or powdered when dry, and is normally composed of 70 to 95 wt % asbestos fibers. In general, friable asbestos in building materials can be found in artificial ashes and embers for gas-fired fireplaces, cavities, partitions of floors and ceilings, insulation of electrical wires, and insulation of panels, etc. In turn, compact asbestos designates an asbestos-containing material consisting in a composite material in which asbestos fibers are embedded in a cement or polymeric matrix. Compact asbestos is not prone to release fibers unless it is sawed or scratched by mechanical tools. In general, compact asbestos in building materials can be found in bonding and finishing cements, masonry fillers, mortars, mastics, asbestos-cement products having generally 4 to 15 wt % chrysotile asbestos and/or 0 to 6 wt % amphibole asbestos, etc.

A number of methods, some of which are patented, have been proposed to destroy or disrupt the molecular structure of asbestos and render asbestos less harmful to human health. The main processes used to transform asbestos into inert materials have been traditionally based on chemical treatment (typically by applying acid), thermal treatment and mechanochemical treatment. More recently, methods using a biochemical and microbiological approach have been developed.

Regarding acid-based chemical treatments, various methodologies that include the use of organic or mineral acids have been developed for the transformation of asbestos-containing materials and the rendering of secondary, recyclable and often reusable materials. In particular, mineral acids such as hydrofluoric acid, hydrochloric acid and sulfuric acid, as well as organic acids such as formic acid and oxalic acid, have been used to treat asbestos.

Regarding thermal treatments, it is well-known that dehydroxylation of chrysotile asbestos occurs in the range 650 to 750° C. It is also known that, at around 1000° C., the fibrous structure of chrysotile asbestos becomes loose and a new crystalline structure (forsterite and/or enstatite) is formed. Further, amphiboles such as crocidolite asbestos decompose at around 1050 to 1100° C. through a complex reaction path involving iron oxidation, which leads to formation of pyroxene, enstatite, hematite and cristobalite. Tremolite asbestos, in turn, decomposes into diopside, enstatite and cristobalite.

Vitrification is one of the most effective thermal processes for treatment of asbestos. The benefit of vitrification derives from the complete destruction of the fibrous structure and the formation of a glass-forming mixture which can be recycled as secondary glass material, due to the fact that asbestos-containing materials do not contain heavy metals. For instance, in the INERTAM-Europlasma process, vitrification of asbestos-containing materials is carried in a cylindrical furnace by a plasma torch at 1600° C. This is currently the only method of conversion of asbestos-containing materials that has been successfully adapted from a lab scale to a fixed, large-scale industrial plant. However, the process costs for rendering asbestos inert using this plasma-torch-based large-scale industrial process are, unfortunately, prohibitively high.

As to the biochemical and microbiological processes for treating asbestos, the best existing process known nowadays comprises the disintegration of the crystal planes of brucite (oxygen-magnesium) which are present within the crystalline planes of chrysotile as an indirect effect of metabolism of the bacterial cultures. Due to the presence of metabolites secreted by bacteria, decomposition of the crystal planes appears to be caused by acidification of the reaction environment. The process includes the steps of preparing an acid liquid/suspension by subjecting a food industry waste material to mixed bacterial and fungal growth and/or fermentation and treating the asbestos-containing materials with the acid solution/suspension obtained from the mixed fermentation at a temperature of 120 to 170° C. and a pressure of 2 to 10 bar. While this process may be effective, it requires from half a day to several days for completion, and is thus not sufficiently productive.

Hydroxyapatite (HAp) is another material used in chemistry, biology and other technical fields, and consists in a calcium phosphate chemically similar, in morphology and composition, to the mineral component of bones and hard tissues in mammals. It is one of few materials that are classed as bioactive, meaning that it will support bone ingrowth and osseointegration when used in orthopedic, dental and maxillofacial applications. The empirical formula of hydroxyapatite can be written as:

$$Ca_5(PO_4)_3(OH)$$

The chemical nature of hydroxyapatite lends itself to substitution, meaning that it is not uncommon for non-stoichiometric hydroxyapatites to exist. The most common substitutions involve carbonate, fluoride and chloride substitutions for hydroxyl groups. Particularly, it has a hexagonal structure and a stoichiometric Ca/P ratio of 1.67, which is identical to bone apatite. An important characteristic of hydroxyapatite is its stability when compared to other calcium phosphates. Thermodynamically, hydroxyapatite is the most stable calcium phosphate compound under physiological conditions similar to the temperature, pH and composition of the body fluids, and it decomposes at temperature of about 800-1200° C. depending on its stoichiometry.

There is a permanent need for solutions which allow to dispose of industrial waste materials, construction materials and/or any substance or product which is no longer used or usable. For example, in view of the above, there remains a need for a safe disposal method capable of neutralizing acids. There also remains a need for a method for safely destroying concrete and/or asbestos-containing materials (ACMs) Disposal methods should not only be applicable in large-scale industry, but should also be productive and non-hazardous to human health and the environment.

SUMMARY OF THE INVENTION

The present invention is directed to provide a process for the destruction of a matrix material by simultaneously- and synergistically-subjecting the matrix material to chemical reactions with an acid in an acid solution and causing a cavitation within the slurry formed by the matrix material and the acid solution. In preferred embodiments, the process can use acid wastes and allows for the neutralization of said acid wastes. Alternatively or additionally, the process enables the destruction of a cement material and/or the destruction or denaturation of asbestos-containing materials (ACMs) if said cement and/or ACMs are used as matrix material(s). As a result of the process, inert secondary raw materials (SRMs) that are usable, marketable and non-hazardous to human health and the environment can be obtained. The matrix materials treated in the processes of the invention may include both friable and compact matrix materials such as cement, polymer, mortar, and vinyl, and may or may not contain asbestos. If present, the asbestos may come in fibril form or in alternative forms. The process comprises a synergistic combination of physical, biological and chemical processes which is capable of neutralizing acid solutions, accelerating the destruction of the matrix material and the consequent dissociation of the matrix material, allowing, for instance, the subsequent destruction of asbestos fibers eventually contained in the matrix material. This destruction splits the acid solution and the matrix material and yields usable and marketable metals and chemicals.

Under optimal conditions, the synergistic process of the invention can successfully carry out a complete acid solution neutralization and matrix material destruction (e.g., cement destruction and/or denaturation of asbestos-containing materials) in about 10 minutes with a continuous cycle. The invention thus provides a significant process time reduction in comparison to conventional neutralization, destruction and/or denaturation processes, the best of which require more than half a day and are not replicable in a secure manner outside a laboratory setting.

In a first implementation of the invention, a process for the destruction of a matrix material comprises forming a slurry or suspension by combining the matrix material with an acid solution, and subjecting the slurry or suspension to cavitation. Cavitation of the slurry intensifies and accelerates the chemical reactions taking place in the slurry and significantly reduces the total matrix material destruction process time. An optimized process, as well as a further reduction of the process time, can be obtained by using a cavitation apparatus capable of performing two or more cavitations of different kind which act simultaneously in a same geometric space where the slurry transits.

In a second aspect, the process can further include a step of grinding the matrix material to obtain matrix material particles, prior to the step of forming a slurry or suspension, to increase the surface react area of the matrix material and thus increase its reactivity to the acid solution. For instance, the matrix material particles obtained by grinding the matrix material can have a size of about 0.1 to 100 millimeters or, in some embodiments, 0.1 to 50 millimeters.

In another aspect, the process can further include a step of polarizing the matrix material particles obtained by grinding the matrix material, prior to the step of forming a slurry or suspension. The step of polarizing the matrix material particles can include subjecting the matrix material particles to a cold plasma torch, and preferably to a cold atmospheric plasma torch.

In another aspect, the step of forming a slurry or suspension by combining the matrix material with an acid solution can include immersing the matrix material in the acid solution.

In another aspect, the acid solution can have a pH in the range of from 0 to 6.

In another aspect, the acid solution can include at least one inorganic acid.

In another aspect, the acid solution can include at least one organic acid.

In another aspect, the acid solution can include a waste liquid originated in a separate industrial process. In some embodiments, the process can further include a step of increasing the acidity of the waste liquid. For example, the step of increasing the acidity of the waste liquid can include adding genetically modified microorganisms to the waste liquid, the microorganisms reacting with components of the slurry or suspension and demolishing the molecular structure of said components.

In another aspect, the process can further include a step of applying a hydrothermal treatment to the slurry or suspension. In some embodiments, the step of applying the hydrothermal treatment can be carried out in loop with the step of subjecting the slurry or suspension to controlled cavitation.

In another aspect, the hydrothermal treatment can be carried out in a hydrothermal reactor at a temperature of about 50 to 300° C. and with an internal pressure from about 1 to 60 atm. In some embodiments, the hydrothermal treatment may be carried out within a reactor which ensures the preservation of the constancy of the ideal physical parameters for the reaction in the physical chemical environment of the matrix material destruction and preventing reformation. Additives such as the following may be incorporated to the slurry being processed in the reactor.

In another aspect, the process can further include a step of recovering at least one inert, secondary raw material from the slurry or suspension, after the step of applying a hydrothermal treatment to the slurry or suspension.

In another aspect, the matrix material can include cement. The cement may or may not include asbestos and/or other components.

In another aspect, the matrix material can include at least one asbestos-containing material (ACM).

In another aspect, the at least one asbestos-containing material (ACM) can include at least one of cement, concrete, gypsum and vinyl. In other embodiments, the asbestos-containing material (ACM) may not include any of these components.

In another aspect, the matrix material can include at least one of a friable or compact matrix material.

In another implementation of the invention, a process for the destruction of a matrix material comprises forming a slurry or suspension by combining the matrix material with an acid solution which reacts chemically with the matrix material, and subjecting the slurry or suspension to cavitation simultaneously with the reacting of the matrix material with the acid solution. The process further comprises a step of applying a hydrothermal treatment to the slurry or suspension, which is optionally executed forming a loop with the cavitation and chemical reaction step.

In yet another implementation of the invention, a process for the destruction of a matrix material comprises grinding the matrix material to obtain matrix material particles, and polarizing the matrix material particles. The process then includes forming a slurry or suspension by combining the polarized matrix material particles with an acid solution which reacts chemically with the polarized matrix material particles, and subjecting the slurry or suspension to cavitation simultaneously with the reacting of the polarized matrix material particles with the acid solution. The process further comprises a step of applying a hydrothermal treatment to the slurry or suspension, which is optionally executed forming a loop with the cavitation and chemical reaction step. Finally, the process includes a step of recovering at least one inert, secondary raw material from the slurry or suspension, which is carried out after the step of applying a hydrothermal treatment to the slurry or suspension.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a continuous, accelerated and complete process for the destruction of a matrix material by simultaneously- and synergistically-subjecting the matrix material to chemical reactions with an acid in an acid solution and causing a cavitation within the slurry formed by the matrix material and the acid solution. In preferred embodiments, the process can use acid wastes and allows for the neutralization of said acid wastes. Alternatively or additionally, the process enables the destruction of a cement material and/or the destruction or denaturation of asbestos-containing materials (ACMs). As a result of the process, inert secondary raw materials (SRMs) that are usable, marketable and non-hazardous to human health and the environment can be obtained.

Figure 1:
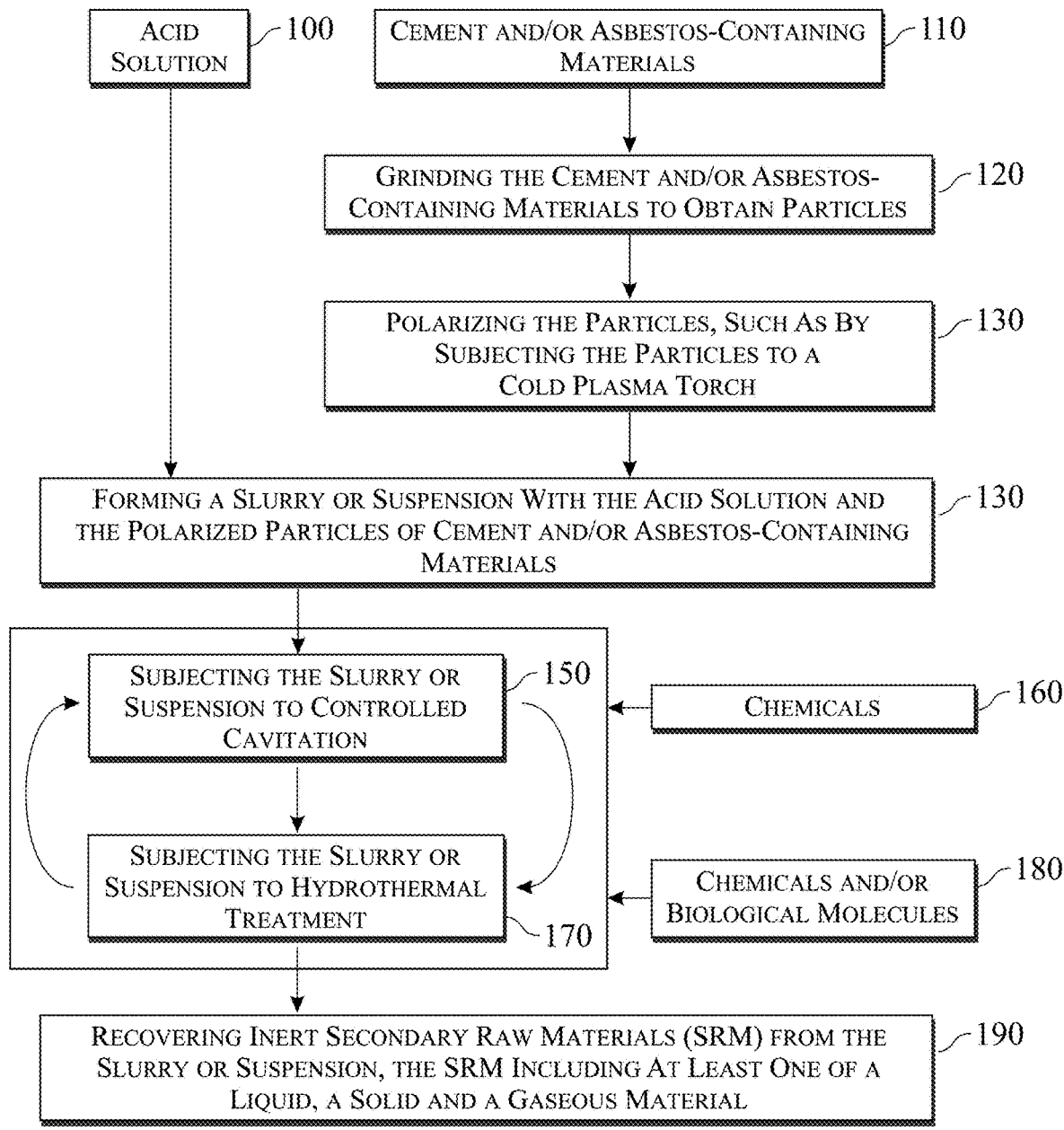
FIG. 1 presents a flow diagram of an accelerated process in accordance with the invention, for the disposal of acid wastes, for the destroying of concrete and/or for the denaturation of asbestos-containing materials (ACMs) using synergistic physical, biological and chemical treatments with the addition of chemicals and/or biological molecules, and for the recovery of inert secondary raw materials (SRMs) that are non-hazardous to human health and the environment.

Referring to the flow diagram in FIG. 1, an illustrative embodiment of a method in accordance with the invention is illustrated. The method begins with an initial step of obtaining and/or appropriately placing a set of initial or matrix materials. The matrix materials include a first matrix material 100 or acid solution, which may include an acid waste, as described in more detail hereinafter. The matrix materials further include a second matrix material 110 such as, but not limited to, cement, concrete, gypsum, vinyl, asbestos or combinations thereof. In other words, the second matrix material may or may not include asbestos-containing materials (ACMs). For example, as shown in the drawing, the second matrix material 110 can include cement and/or an asbestos-containing material (ACM); for instance, the second matrix material 110 can comprise concrete containing asbestos fibers. The method in accordance with the invention provides an accelerated process for the substantially complete neutralization of the first matrix material 100 or acid solution, and the destruction and/or denaturation of the second matrix material or materials (hereinafter referred to generally as second matrix material 110, in singular form). For example, in the embodiment shown in the drawing, the method allows to neutralize an acid solution which can include acid wastes, and also destroy cement and/or denaturize asbestos-containing materials (ACMs). The process in FIG. 1 uses an innovative method to disrupt the molecular structure of the second matrix material 110, including asbestos fibers if present, in a short period of time and to fully recycle the final product as secondary raw materials that are non-hazardous to human health and the environment.

Once the matrix materials are obtained at initial step, the matrix materials follow different paths. At step 120, the second matrix material 110 (in this embodiment, cement and/or asbestos-containing materials) are initially ground to form particles (cement and/or asbestos-containing particles). Grinding the cement and/or asbestos-containing materials (or other second matrix material) to form cement and/or asbestos-containing particles is helpful, for instance, in that it prepares hydrophobic components in the cement and/or asbestos-containing materials to subsequently react in a hydrophilic environment such as acidic aqueous solution (step 140). In preferred embodiments, the resulting cement and/or asbestos-containing particles can have a size of about 0.1 to 100 millimeters, and more preferably about 0.1 to 50 millimeters. Grinding will be carried out in vacuum or under negative pressure conditions to prevent dispersion of asbestos fibers, if present, into the environment.

At step 130, the particles are subjected to polarization. More specifically, the second matrix material particles (such as concrete and/or asbestos-containing particles) are superficially activated and polarized by subjection to a cold plasma torch, for purposes that will be described in greater detail hereinafter and shown in FIG. 3. The cold plasma torch that is applied to the particles is in an ionized state and contains ionized atoms, neutral molecules, electrons, ions and radicals. The cold plasma torch is preferably a non-thermal plasma torch, also known as non-equilibrium plasma torch due to the fact that the average energy of the electrons in the plasma is much greater than that of the ions and neutrals. The cold plasma torch that is applied to the particles is preferably at atmospheric pressure.

At step 140, the polarized particles are submerged in the first matrix 100 or acid solution to form a slurry or suspension. The acid solution may have a pH in the range of from 0 to 6, and may include at least one organic or inorganic acid. For example, the acid solution may include at least one of sulfuric acid, sulphurous acid, hydrochloric acid, hydrofluoric acid, phosphoric acid, phosphorous acid, nitric acid, nitrous acid, acetic acid, formic acid, lactic acid, trifluoroacetic acid and a combination thereof, without limitation. In some embodiments, at least one inorganic and/or organic acid waste liquid from a separate industrial process can be used to prepare the acid solution. For instance and without limitation, the present process in FIG. 1 may utilize waste liquids from at least one of the following industries or industrial processes: food industry; chemical surface treatment industry for the coating of metals and other materials (e.g., galvanic processes for applying a zinc coating); phosphating processes; non-ferrous hydrometallurgy; waste treatment industry; metal surface treatment by pickling; electronic cleaning processes; alkali degreasing; and metal surface treatment by anodization.

In the event that waste liquid from the food industry is used, the waste liquid may be acidified using selected genetically modified microorganisms. The genetically modified microorganisms are preferably selected to react with the cement and/or asbestos-containing slurry components and disrupt the eventually present molecular structure of the matrix material and the crystalline habit of the asbestos fibers in the asbestos-containing particles, if present. In some embodiments, the selected microorganisms can be added to the slurry within the cavitation apparatus. Alternatively or additionally, the selected microorganisms can be added to the slurry by feeding the slurry to a top of a separate tower containing microorganism beds. The beds can be created by treated mussel shells or other fitted supports.

By submerging the polarized particles in the acid solution to form a slurry or suspension at step 140, the disruption of the molecular structure of the second matrix material begins. For instance, in the event that the second matrix material contains cement, the simultaneous presence of acid and cement causes a reaction between the acid(s) and the cement particles. Having previously applied an atmospheric pressure plasma torch increases the surface energy of the second matrix material 110 and allows the second matrix material particles to be more easily (and thus rapidly) dispersed in the acid solution, contributing to sensibly reduce the duration of the process. In addition, this accelerating and potentiating effect is synergistic with the effect of the controlled cavitation of step 150, described hereinafter.

The reaction between the acid solution and the second matrix material particles (e.g., cement and/or asbestos-containing particles), indicated by step 150, is carried out in a controlled cavitation apparatus or first reactor. A cavitation apparatus is understood to be an apparatus for applying forces on a liquid and causing cavitation in the liquid. Cavitation is a phenomenon which involves the rapid formation and implosion of bubbles in a low-pressure area in liquids by means of mechanical forces. Due to the low pressure, the liquid vaporizes, forming cavities. At the edges of each cavity, small quantities of vapor are emitted as cavitation bubbles. The process of cavitation bubble generation and the subsequent growth and collapse of the cavitation bubbles results in very high energy densities and very high local temperatures and local pressures at the surfaces of the cavitation bubbles for a very short period of time. When they collapse, the cavitation bubbles energetically force the liquid into very small volumes, thereby creating spots of high temperature and emitting shock waves throughout the liquid. Conditions in the collapsing cavitation bubbles can reach 5000° C. and 1000 bar in Just microseconds, parting from initial conditions of room temperature and 1 bar, respectively ("The temperature of cavitation"; Flint E B, Suslick K S; Science, 1991 Sep. 20; 253(5026):1397-9; and "Ultrasonics: Fundamentals, Technologies, and Applications, Third Edition"; Dale Ensminger, Leonard J. Bond; CRC Press, 19 set 2011).

For instance and without limitation, the cavitation apparatus of the present disclosure can include a mechanical cavitation apparatus (e.g. a propeller or agitator), or a sonication apparatus preferably generating sound waves having a frequency or frequencies greater than 20 kHz to produce a cavitational effect in the liquid. In some embodiments, cavitation is carried out by executing more than one different kinds of cavitation simultaneously within a same spatial volume and with reciprocal synergies, i.e. having the effects of the different kinds of cavitation take place in the same space and time so that each cavitation is enhanced by the other cavitation(s). In some embodiments, the second matrix material particles are combined with the acid solution to form the slurry prior to passing the slurry through the cavitation apparatus, in order for the slurry chemical reactions to take place simultaneously with cavitation. Alternatively or additionally, the second matrix material particles can be added to the acid solution within the cavitation apparatus.

Thus, in accordance with the process disclosed herein, an illustrative embodiment of which is shown in FIG. 1, cavitation is carried out on the slurry during the chemical reaction between the acid solution and the second matrix material particles. In other words, with reference to FIG. 1, at step 150 the slurry is subjected to cavitation in the cavitation apparatus, and the effects of the cavitation are provided simultaneously to the chemical reactions between the acids and the second matrix material particles (e.g., cement and/or asbestos-containing particles) that is taking place in the slurry.

As indicated by step 160, additives may be added to the slurry or suspension being treated in the cavitation apparatus (step 150). The additives can include acidic or acidifying substances or chemicals, in order to multiply the effect of the acid solution comprised in the slurry.

Figure 2:
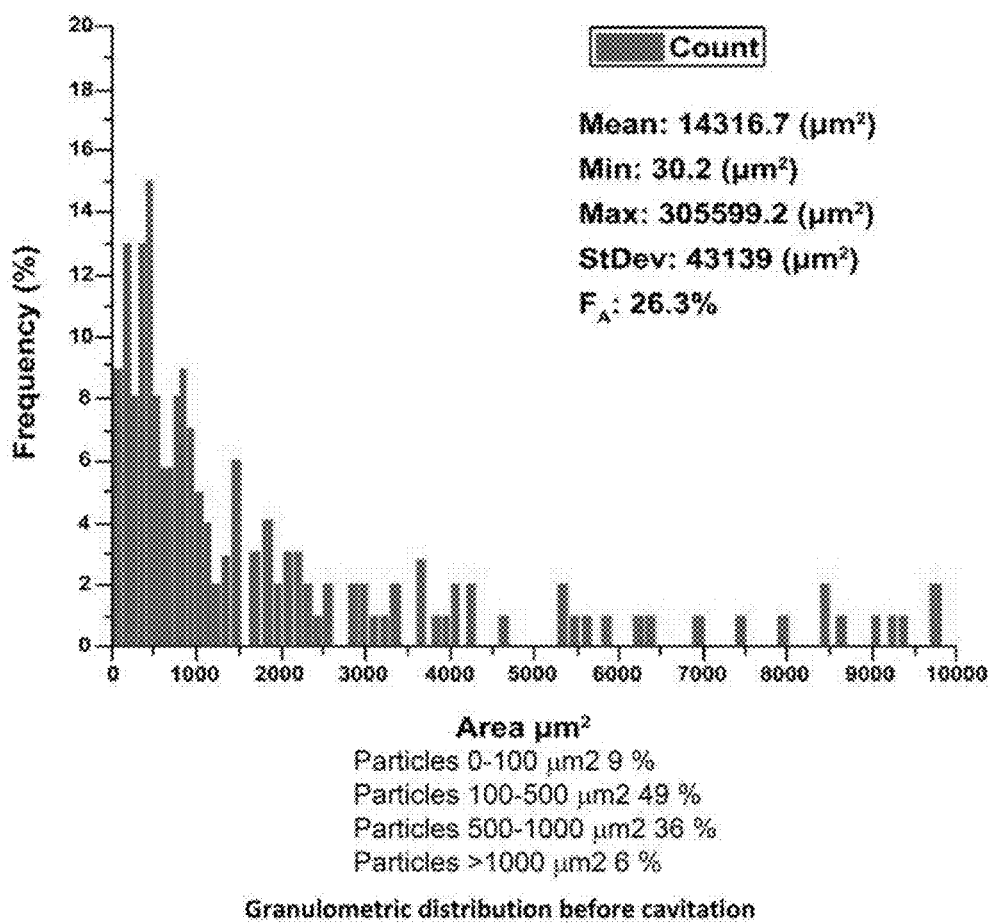
FIG. 2 presents a graph of the matrix granulometric distribution before the cavitation (about 85% of the particles being sized between 100-1000 $\mu m^2$) and the matrix granulometric distribution of three different samples taken during the cavitation test (after 5 minutes at 1500 rpm, after 10 minutes at 1000 rpm and after 15 minutes at 2500 rpm)
Figure 2:
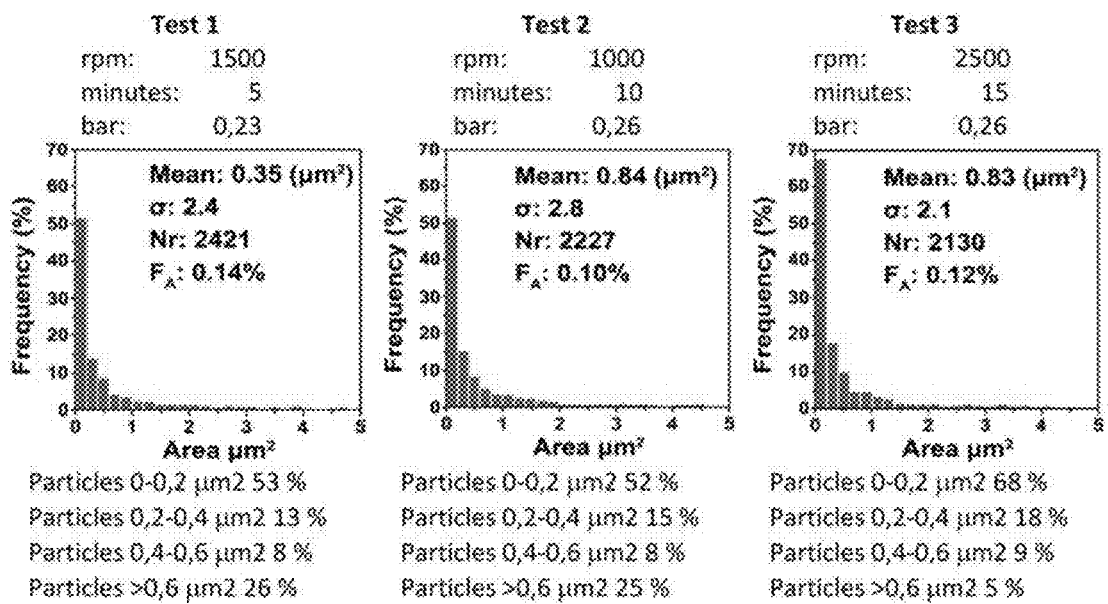

Simultaneous cavitation and acid-based chemical reaction provide unexpected advantageous effects to the neutralization of the acid solution 100, and to the destruction and/or denaturalization of the second matrix material 110 (e.g., to the destruction of cement and/or the denaturation of asbestos-containing materials (ACMs)). Specifically, cavitation of the liquid-solid, slurry material causes a series of unique physical phenomena that affects the solids (i.e. the cement, the asbestos, etc.) in the liquid medium (i.e. the acid solution). Microjets and high-energy shockwaves are produced in the liquid medium, and during the collapse of a cavitation bubble, high local temperatures and pressures are generated. The shockwaves induce mechanical damage such as material erosion in nearby cement and/or asbestos-containing particles in the liquid medium. The microjets induce erosion and pitting in the surface of the cement and/or asbestos-containing particles. Cavitation also creates high-velocity inter-particle collisions that may alter the morphology and size of the cement and/or asbestos-containing particles dramatically. The power of the shockwaves generated by the cavitation process uniformly disrupts everything in their paths. Thus, by means of cavitation, the cement and/or asbestos-containing particles in the slurry are fractured into even smaller cement and/or asbestos-containing particles as shown in the graphs of FIG. 2, which represent the matrix granulometric distribution before the cavitation (about 85% of the particles between 100-1000 μm$^2$) and the matrix granulometric distribution of three different samples taken during the cavitation test. It is more than evident that the granulometric becomes gradually finer as rpm and cavitation time increase. Smaller cement and/or asbestos-containing particles result in a better dispersion and greater surface area on which the chemical reactions with acids can take place.

Therefore, according to the process of the present invention, submerging the cement particles and/or asbestos-containing particles in an acid solution and submitting the consequently-formed slurry to a cavitation process produce two synergistic effects: on one hand, the physical effects of the cavitation (particle dimension reduction, damaging of the morphology and crystal structure of the asbestos fibers if present, etc.) and, on another, the chemical effects of the acid-based chemical reactions. Most significantly, the synergy between the cavitation and the acid reaction causes the cement and/or asbestos fibers to be disrupted very quickly and broken down into even smaller-sized particles.

For instance, testing has been carried out using concrete and asbestos-containing materials both comprising cement. It is well-known that acid decomposes cement according to the following equation:

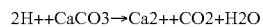

$$2H^+ + CaCO_3 \rightarrow Ca^{2+} + CO_2 + H_2O$$

Testing has proven that, by immersing concrete and/or asbestos-containing material comprising cement in the acid solution to form a slurry, and simultaneously submitting the slurry to cavitation, the above cement decomposition reaction takes place in an extremely brief period of time. Specifically, it has been observed that the amount of cement matrix material decreases in about 50 to 80 wt % in only 1 to 10 minutes. In addition, due the synergistic cavitation and acid attack (especially in the case of chrysotile asbestos), the asbestos fibers are significantly reduced in size and the crystal structure appears notably damaged; specifically, cavitation reduces the particles of the matrix and asbestos from a macroscopic to a microscopic dimension, increasing the contact area between particles and acid suspension. Regarding the asbestos, the physical reduction of the particles damages the crystal habit and chemically decreases the rate of the reaction with the acid.

In step 170, as mentioned heretofore, the remaining slurry including the neutralized acid solution and the disrupted cement and/or the denatured asbestos is subjected to a hydrothermal reaction to complete transformation of the slurry into inert materials that are non-hazardous to human health and the environment. As shown in FIG. 1, step 170 may include a step 180 in which other chemicals and/or biological molecules are added to the slurry. In turn, the inert, non-hazardous materials generated by step 170 can then be recovered at step 190.

More specifically, the slurry from step 150 is subjected to a hydrothermal reaction at high temperature and pressure conditions to hydrolyze and cause a dissolution of the undissolvable cement and/or asbestos materials in the slurry. In some applications, the hydrothermal treatment may be carried out at a temperature of from about 50° C. to about 300° C. for a period of about 1 to 2 hours. The hydrothermal reaction may be carried out in a closed environment and by microwave, convection and/or conduction heating, for instance and without limitation. Further, in some applications, the hydrothermal reaction may cause a subcritical reaction in the slurry, the subcritical reaction including at least one of: a change in the properties of crystal materials forming the asbestos materials; a reaction affecting the thermodynamic or dynamic stability of crystalline materials driving the phase transformations; dehydration of the asbestos materials; and decomposition of the asbestos materials. In some embodiments, as indicated by step 180, the slurry being processed in the hydrothermal reaction is provided with natural or synthetic binging/chelating substances such as, but not limited to, acidic substances (e.g., phosphoric acid, etc.), acidifying substances (e.g., salmon milt, etc.), aluminum, aluminum compounds, hydroxyapatite, other hexadentated molecules (molecules with a ligand that combine a central metal atom with six bonds like TPEN or EDTA), and/or biological substances (such as, but not limited to, fishery waste, egg shells, and terrestrial or marine animal bones). These substances have binder/chelating power on metals contained in asbestos, especially on magnesium, which prevent the reformation of asbestos. After reacting with asbestos, these substances, some of which are of biological origin, may lead to subsequent usable by-products. For example, should the substances include phosphorus, the phosphorus will enrich the process by-products allowing for the production of high-quality agricultural fertilizers or for the treating of polluted water. In another example, some of the above-mentioned substances may lead to the formation of salts other by-products which are usable as dietary supplements (e.g., magnesium). Some of these substances may also be used in the pharmaceutical field (e.g., the hexadentated molecules which are chelating and therefore neutralize heavy metals). The use of the above-mentioned substances can also provide great environmental benefits such as, but not limited to, binding/chelating heavy metals in polluted soils in order to reclaim them.

As further shown in FIG. 1, the step 170 can form a loop with step 150. In some embodiments, the loop can end when scans made with a microscope confirm that the desired results are achieved.

In some embodiments, the hydrothermal reaction (step 170) of the cement and/or asbestos-containing particles can be carried out in a second, plug flow reactor. A plug flow reactor is understood to be a reactor that allows a parallel reaction progress during the flow advancement, so that in each reactor's "room" the conditions are "stationary". More specifically, in each internal environment, a part of the flow will be temporarily separated from the rest of the slurry and subjected to a certain chemical equilibrium and to physical variables for a given time span. However, the so fractionated process continues to be a continuous flow cycle with an obvious intrinsic decrease in management complexity despite the presence of several contemporary phases with competitive reactions that shed gases, transform fluids and melt solids that, by their inherent nature, tend to re-aggregate and risking to void at each stage the whole process.

For instance and without limitation, the plug flow reactor of the present disclosure can be horizontal or vertical as these reactors are controlled by a pressure variation defined by external parameters and they are not dependent on gravity. In one embodiment, a vertical apparatus can be used, with one of the usable reaction reagents, asbestos, being a crystalline solid that benefits from such a disposition, the reactor having with three compartments defined by horizontal sectioning. The slurry can enter through the upper part that will only be partially filled. The available space and the mixing of the reactants' flows encourage the triggering of the reactions; the reactants are injected from different directions and perspectives in order to clash against each other by generating a turbulent fluid dynamics that shortens the triggering times of the chemical reactions and minimizes the space required for them. The dimensions of this first compartment will be calibrated according to the times deemed necessary for triggering all reactions. The actual continuous tubular reactor, fitted with internal geometric elements, constitutes the second compartment and can be separated from the former with standard valves and/or timed magnetic valves. Depending on the particular needs of the slurry under treatment, determined by the nature of the matrices used, this section may can be cooled/heated with different thermal profiles to fulfill the function of tube heat exchanger and can be stretched or shortened by removable segments or it is possible to opt for a greater number of loops between the cavitation apparatus and the reactor in order to increase the slurry contact times with the elements that are added in this process phase. In the third compartment, preferably of a conical shape, the reacted mixture is scanned by a microscope to determine if the searched result is achieved or the need for a subsequent loop through the cavitation apparatus.

As known, the reaction rate of the dissolution of cement and/or asbestos depends on the acidity, the temperature and apparent activation energy. More specifically, the rate of a dissolution may be measured as a change in concentration of a species as a function of time. The rate law for a dissolution may be given by: $J=k[C_e-C]^a[H^+]^b$ where k is the reaction rate parameter, C is the concentration of the measured species in the bulk solution, $C_e$ is the steady-state concentration to which the solution tends, and a and b are the reaction orders with respect to species C and hydrogen ion concentrations respectively. Taking logs of the equation above and keeping pH constant gives: $\log J = \log k' + a \log [C_e-C]$, where $k'=k[H^+]^b$. Taking logs of the Arrhenius equation gives $\log k' = \log A - E_A/2.303RT$, where k' is the reaction rate constant and $E_A$ is the apparent activation energy for the reaction.

The rate of neutralization of the acid solution, destruction of cement and/or denaturation of asbestos-containing materials (ACMs) of the present process in FIG. 1 is relatively high due to several causes.

In the first place, the neutralization of the acid solution improves the dissolution of the asbestos and/or cement material in the slurry, as the acids reduce the instances of an opposite reaction to dissolution. For example, the dissolution of chrysotile asbestos for pH<9 during the hydrothermal treatment is the following:

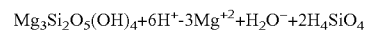

$$Mg_3Si_2O_5(OH)_4 + 6H^+ \rightarrow 3Mg^{+2} + H_2O^- + 2H_4SiO_4$$

In the second place, the loop formed by the hydrothermal reaction (step 170) and the cavitation (step 150) of the process of FIG. 1 is such that it energetically meets the dissolution of asbestos and/or cement with the consequent neutralization of the acid solution. Thus, the dissolution reaction is provided with the necessary energy for it to take place at a high rate.

During the hydrothermal reaction, the concentration of OH— increases logarithmically with time at room temperature, and the opposite reaction may occur. The presence of acids reduces the instances of the opposite reaction and thus, especially in presence of asbestos, the quantity of Mg released into the solution is increased. The additivated substances (step 180) such as acidic substances (e.g., phosphoric acid, etc.) or acidifying substances (e.g., salmon milt, etc.), aluminum and/or its compounds and other substances (e.g., hydroxyapatite, other molecules also hexadentated, biological substances such as pretreated bones, etc.) that have binder/chelating power on metals contained in asbestos, especially on Mg, prevent reformation of asbestos fibers.

In the third place, an increase in the hydrothermal reaction temperature can exponentially accelerate the rate of the asbestos and/or cement destruction reaction (e.g., the dissolution reaction for chrysotile asbestos indicated above), as proven by the Arrhenius equation ($d \ln k/dT = E/RT^2$, where k is the rate constant of the chemical reaction, T is the absolute temperature of the reaction, E is the activation energy, and R is the universal gas constant). In addition, the hydrothermal reaction can also be capable of changing the redox potential of the reactants.

In the fourth place, the neutralization of the acid solution forming the base of the slurry is improved by the synergistic cavitation and by the dissolution of the asbestos and/or cement material, as the smaller-sized cement and/or asbestos particles dissolve more rapidly due to the increased contact area between the smaller-sized particles and the acid suspension.

As mentioned heretofore, at step 190, liquid, solid and gaseous inert materials are obtained or recovered. The liquid inert materials may include metals such as Fe, Al, Ni, Mn, Na, Ca, K and Mg. It must be noted that, in chrysotile asbestos, Mg represents about 32 wt % of its stoichiometry. These elements may be recovered as both marketable ingots and purified salts. The solid inert materials can include silicate, silica, phosphate, sulfate, nitrate and micro elements (Fe, Ca, K, Mn, etc.). These solid inert materials may be suitable for preparation, for instance and without limitation, of any kind of chemicals. In turn, gaseous inert materials, such as, but not limited to, $CO_2$ may be recovered, purified and stored or used as a reagent for another process.

A test was carried out by placing an asbestos-like the material in a container with water and 5% hydrochloric acid under agitation. As shown in the topmost graph of FIG. 2, the resulting material was milled with a granulometry such that most particles (85%) were sized between 100-1000 $\mu m^2$. Subsequently, in order to validate the process, 4 kg of material, 36 liters of water and 8 liters of 5% HCl were placed in the cavitation apparatus. Three different samples were taken during the cavitation test, after 5 minutes at 1500 rpm, after 10 minutes at 1000 rpm and after 15 minutes at 2500 rpm. The analysis showed that test 3 generated samples with a finer granulometry than the first 2 tests passing from about 50% of particles 0-0.2 $\mu m^2$ for the first two tests at about 70% for Test 3 Even with regard to granulometry greater than 0.2 $\mu m^2$, it is observed a general increase of percentages up to 1 $\mu m^2$ and a consequent decrease in percentages above 1 $\mu m^2$. It follows that such material without cavitation has a significantly greater granulometry (over 85% between 100 and 1000 $\mu m^2$) than that obtained after cavitation treatment in which over 50% has a granulometry of between 0-0.2 $\mu m^2$.

Figure 3:
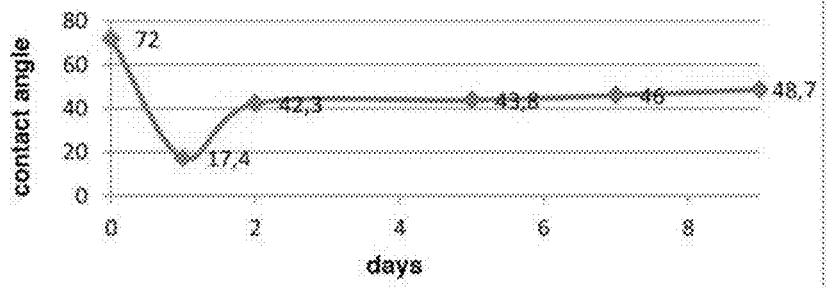
FIG. 3 presents a diagram showing the wettability by measuring the contact angle on a plastic plate after plasma treatment, with measurement repetition over time, and two photographs showing the behavior of a drop of water on an untreated sheet and on a treated sheet.
Figure 3:
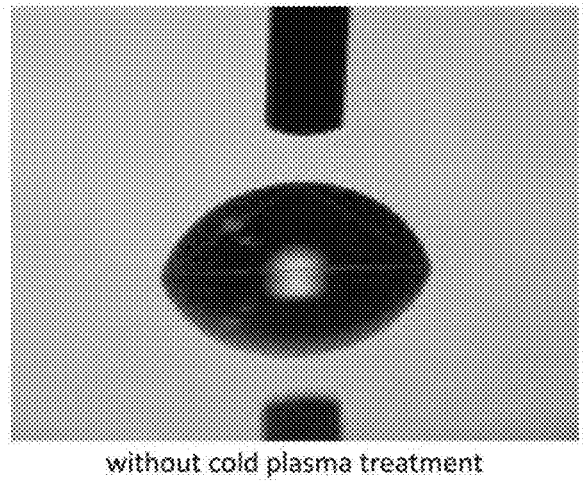
Figure 3:
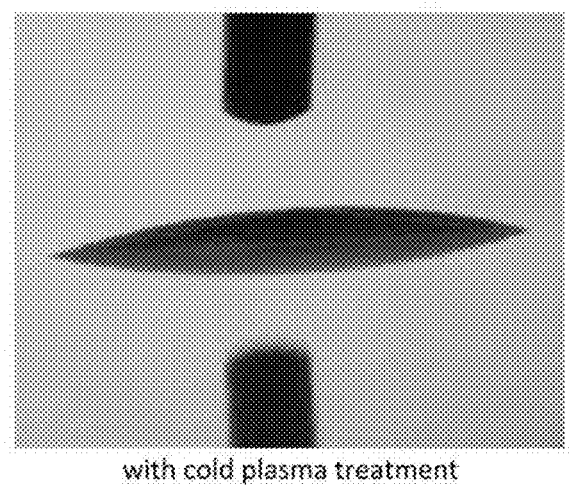

The illustration of FIG. 3 provides an example of the effect of polarizing the particles using a cold plasma torch prior to adding the acid solution in order to form the slurry. As mentioned heretofore, the cold plasma torch allows to increase the surface energy of the second matrix material 110 (cement and/or asbestos-containing material), enabling the second matrix material to be more easily (and thus rapidly) dispersed in the acid solution. In this example, a highly hydrophobic polyamide powder having a density higher than that of water (1.23 $g/cm^3$) was used. The material was treated with a plasma flow of 40 l/h in air and was collected through a cyclone system. 2 samples of 5 g of powdered polyamides were collected and weighed: one treated with the plasma process and the other one as such. These were then placed in two containers containing 50 ml of demi water and placed in magnetic stirring. After 5 minutes of stirring, two samples of known quantity (27.5 ml) of powder were taken using a graduated syringe. water. Then, the collected samples were weighed and the density of the solution measured. From the comparison of the weight and density values of the collected samples it resulted that the cold plasma treatment increased the wettability and dispersion of the polyamide powder by 5 times. The top diagram of FIG. 3 shows the wettability of the polyamide powder by measuring the contact angle on a plastic plate after plasma treatment, with measurement repetition over time. The greater hydrophilicity is made even more evident by the following two photographs showing the behavior of a drop of water on an untreated sheet and on a cold plasma treated sheet.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A process for the destruction of a matrix material, comprising:
   forming a slurry or suspension by combining the matrix material with an acid solution; and
   subjecting the slurry or suspension to cavitation.

2. The process of claim 1, further comprising a step of grinding the matrix material to obtain matrix material particles, prior to the step of forming a slurry or suspension.

3. The process of claim 2, wherein the matrix material particles obtained by grinding the matrix material are sized from 0.1 to 100 millimeters.

4. The process of claim 2, wherein the matrix material particles obtained by grinding the matrix material are sized from 0.1 to 50 millimeters.

5. The process of claim 2, further comprising a step of polarizing the matrix material particles obtained by grinding the matrix material, prior to the step of forming a slurry or suspension.

6. The process of claim 5, wherein the step of polarizing the matrix material particles comprises subjecting the matrix material particles to a cold plasma torch.

7. The process of claim 1, wherein the step of forming a slurry or suspension by combining the matrix material with an acid solution comprises immersing the matrix material in the acid solution.

8. The process of claim 1, wherein the acid solution has a pH in the range of from 0 to 6.

9. The process of claim 1, wherein the acid solution comprises at least one inorganic acid.

10. The process of claim 1, wherein the acid solution comprises at least one organic acid.

11. The process of claim 1, wherein the acid solution comprises a waste liquid originated in a separate industrial process.

12. The process of claim 11, further comprising a step of increasing the acidity of the waste liquid.

13. The process of claim 12, wherein said step of increasing the acidity of the waste liquid comprises adding genetically modified microorganisms to the waste liquid, the microorganisms reacting with components of the slurry or suspension and demolishing the molecular structure of said components.

14. The process of claim 1, further comprising a step of applying a hydrothermal treatment to the slurry or suspension.

15. The process of claim 14, wherein the hydrothermal treatment is carried out in a hydrothermal reactor at a temperature of 50 to 300° C. and with an internal pressure from 1 to 60 atm.

16. The process of claim 14, further comprising a step of recovering at least one inert, secondary raw material from the slurry or suspension, after the step of applying a hydrothermal treatment to the slurry or suspension.

17. The process of claim 1, wherein the matrix material comprises cement.

18. The process of claim 17, wherein the matrix material comprises asbestos.

19. The process of claim 1, wherein the matrix material comprises at least one asbestos-containing material (ACM).

20. The process of claim 19, wherein the at least one asbestos-containing material (ACM) comprises at least one of cement, concrete, gypsum and vinyl.

21. The process of claim 1, wherein the matrix material comprises at least one of a friable or compact matrix material.

22. A process for the destruction of a matrix material, comprising:

forming a slurry or suspension by combining the matrix material with an acid solution which reacts chemically with the matrix material;

subjecting the slurry or suspension to cavitation simultaneously with the reacting of the matrix material with the acid solution; and applying a hydrothermal treatment to the slurry or suspension.

23. A process for the destruction of a matrix material, comprising:

grinding the matrix material to obtain matrix material particles;

polarizing the matrix material particles;

forming a slurry or suspension by combining the polarized matrix material particles with an acid solution which reacts chemically with the polarized matrix material particles;

subjecting the slurry or suspension to cavitation simultaneously with the reacting of the polarized matrix material particles with the acid solution;

applying a hydrothermal treatment to the slurry or suspension; and recovering at least one inert, secondary raw material from the slurry or suspension; after the step of applying a hydrothermal treatment to the slurry or suspension.

* * * * *